(12) United States Patent
Rayner et al.

(10) Patent No.: US 11,284,639 B2
(45) Date of Patent: Mar. 29, 2022

(54) METHODS AND COMPOSITIONS SUITABLE FOR PRESERVING THE FRESHNESS OF LOAF-TYPE FOOD PRODUCTS

(71) Applicant: Société des Produits Nestlé S.A., Vevey (CH)

(72) Inventors: Jean Luz Rayner, St. Joseph, MO (US); Michael G Rayner, St. Joseph, MO (US)

(73) Assignee: SOCIÉTÉ DES PRODUITS NESTLÉ S.A., Vevey (CH)

( * ) Notice: Subject to any disclaimer, the term of this patent is extended or adjusted under 35 U.S.C. 154(b) by 155 days.

(21) Appl. No.: 16/690,403

(22) Filed: Nov. 21, 2019

(65) Prior Publication Data
US 2020/0085089 A1    Mar. 19, 2020

Related U.S. Application Data

(62) Division of application No. 14/007,449, filed as application No. PCT/US2012/029249 on Mar. 15, 2012, now abandoned.

(60) Provisional application No. 61/516,145, filed on Mar. 29, 2011.

(51) Int. Cl.
| | |
|---|---|
| *A23L 29/256* | (2016.01) |
| *A23B 4/10* | (2006.01) |
| *A23L 23/00* | (2016.01) |
| *A23L 13/40* | (2016.01) |
| *A23B 4/20* | (2006.01) |
| *A23L 3/3463* | (2006.01) |
| *A23L 29/269* | (2016.01) |
| *A23L 29/238* | (2016.01) |
| *A23L 13/00* | (2016.01) |

(52) U.S. Cl.
CPC .............. *A23L 29/256* (2016.08); *A23B 4/10* (2013.01); *A23B 4/20* (2013.01); *A23L 3/3463* (2013.01); *A23L 13/03* (2016.08); *A23L 13/422* (2016.08); *A23L 23/00* (2016.08); *A23L 29/238* (2016.08); *A23L 29/269* (2016.08); *A23V 2002/00* (2013.01)

(58) Field of Classification Search
CPC .... A23L 29/256; A23L 29/269; A23L 29/238; A23L 13/03; A23L 13/422; A23L 23/00
USPC .......................................................... 426/589
See application file for complete search history.

(56) References Cited

U.S. PATENT DOCUMENTS 2,849,320 A * 8/1958 Weinmann ............... A23B 4/10
426/305
2008/0152774 A1   6/2008 Fernandes et al.

FOREIGN PATENT DOCUMENTS

| WO | 9512323 A1 | 5/1995 | |
|---|---|---|---|
| WO | WO-2009114077 A1 * | 9/2009 | ............ A23L 13/03 |
| WO | 2012134825 A1 | 10/2012 | |

OTHER PUBLICATIONS

Imeson et al., "Handbook of Hydrocolloids", second edition, chapter 7, 8 pages, 2009.
Saha et al., "Hydrocolloids as Thickening and Gelling Agents in Food: a Critical Review", J Food Sci Technol, vol. 47, Issue No. 6, Nov.-Dec. 2010, pp. 587-597.
Lamkey et al., "Hydrocolloids in Food Processing", Chapter 3, 7 pages, Sep. 2, 2010.

* cited by examiner

*Primary Examiner* — Jyoti Chawla
(74) *Attorney, Agent, or Firm* — K&L Gates LLP

(57) ABSTRACT

Methods and compositions maintain the freshness of loaf-type food products in a sauce or gel of suitable viscosity for an extended period. When the loaf-type food products are emptied from a container, the sauce or gel covers the exposed surfaces of the loaf-type food products and does not drip off or dry out. After more than six hours, the loaf-type food products still retain their original color and fresh wet appearance without any crust formation. Accordingly, the methods and composition can solve problems associated with the rapid crusting/drying, color change, off odor, staleness and reduced visual appeal of the loaf-type food products after they have been exposed to air for long time periods.

9 Claims, 1 Drawing Sheet

Loaf-type food products after on exposure to ambient atmosphere
| | Initial | After 3 Hours | After 6 Hours |
|---|---|---|---|
| Standard Loaf | 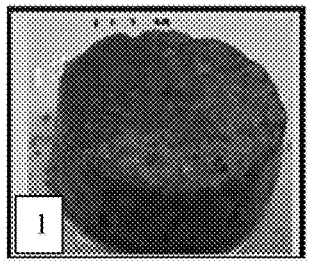 1 | 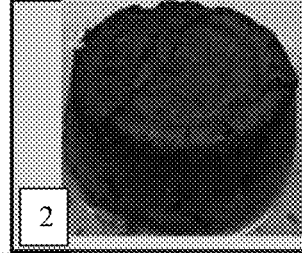 2 | 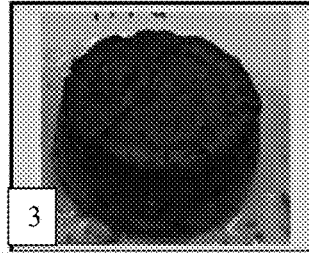 3 |
| Loaf with Gel Cap | 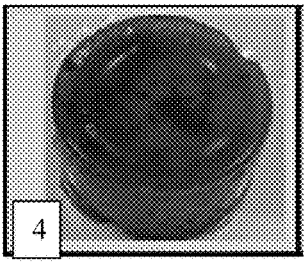 4 | 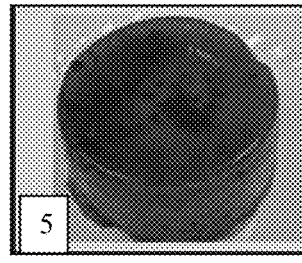 5 | 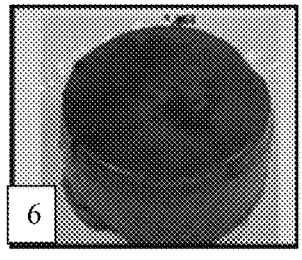 6 |
| Loaf with Viscous Sauce | 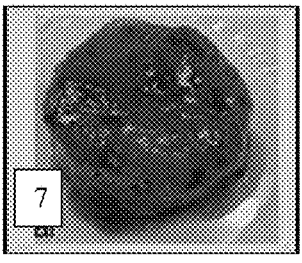 7 | 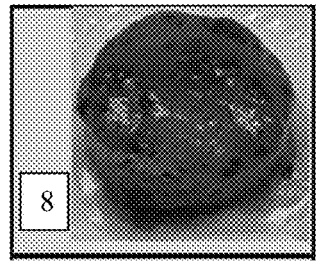 8 | 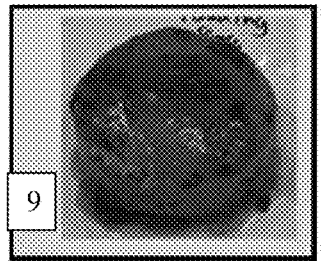 9 |

METHODS AND COMPOSITIONS SUITABLE FOR PRESERVING THE FRESHNESS OF LOAF-TYPE FOOD PRODUCTS

CROSS REFERENCE TO RELATED APPLICATIONS

This application is a divisional of U.S. application Ser. No. 14/007,449 filed Sep. 25, 2013, which is a National Stage of International Application No. PCT/US2012/029249 filed Mar. 15, 2012, which claims priority to U.S. Provisional Application Ser. No. 61/516,145 filed Mar. 29, 2011, the entire disclosures of which are incorporated herein by this reference.

FIELD OF THE INVENTION

The invention relates generally to loaf-type food products and particularly to methods and compositions useful for preserving the freshness of loaf-type food products.

DESCRIPTION OF RELATED ART

Conventional loaf-type food products are typically sold in a container bearing the shape of the loaf-type food products. The loaf-type food products may or may not be covered in a liquid or gravy, which is typically used to add textural variety or flavoring to the loaf-type food products. Nevertheless, when the loaf-type food products are emptied out onto a serving platter, they become exposed to the atmosphere. This causes the loaf-type food products to dry out over a short period (e.g., less than 3 hours) thereby forming an objectionable crust around the edges of the loaf-type food products that is visually unpleasing. Moreover, as the loaf-type food products further dry out, they may darken significantly and develop an objectionable odor. There is, therefore, a need for loaf-type food products that do not dry out after being opened and exposed to air over an extended period.

SUMMARY

It is, therefore, an object of the present invention to provide methods for preserving the freshness of loaf-type food products.

It is another object of the invention to provide sauces or gels for preserving the freshness of loaf-type food products.

It is a further object of the invention to provide containers and packages including a loaf-type food product and a sauce or gel that preserves the freshness of the loaf-type food product.

It is yet another object of the present invention to provide methods of manufacturing a loaf-type food product container or package.

One or more of these or other objects are achieved by combining a loaf-type food product and a sauce or gel capable of maintaining the freshness of the loaf-type food product for at least 3, 4, 5, 6, or more hours. The sauce or gel is added to a container so that the opening of the container is on a side opposite of the sauce or gel while the loaf-type food product added so that it is closest to the opening. This order of the sauce or gel and loaf-type product inside the container ensures that the sauce or gel covers the top of the loaf-type food product when the container is opened and the loaf-type food product is removed or emptied from the container.

Other and further objects, features, and advantages of the present invention will be readily apparent to those skilled in the art.

BRIEF DESCRIPTION OF THE DRAWINGS

FIG. 1 shows photographs comparing: 1) a conventional loaf-type food product, 2) a loaf-type food product with a gel in an embodiment of the present disclosure, and 3) a loaf-type food product with a sauce in an embodiment of the present disclosure, after exposure to the atmosphere over a period.

DETAILED DESCRIPTION

Definitions

The term "loaf-type food product" means a shaped or molded mass of a food product known by the skilled artisan. For example, the loaf-type food product can be a shaped or molded mass of an animal food product such as an emulsified meat product.

The term "animal" means any mammal that benefits from or enjoys loaf-type food products.

The term "freshness" means a condition of having the original qualities substantially unimpaired. For example, a maintained or preserved freshness of the loaf-type food product means that the loaf-type food product is still in a condition equivalent to or substantially equivalent to its original condition immediately after being removed from a container.

The term "top" means the highest point of elevation of a loaf-type food product when the loaf-type food product is removed from a container and placed on a serving apparatus.

The term "single package" means that the components of a kit are physically associated in or with one or more containers and considered a unit for manufacture, distribution, sale, or use. Containers include, but are not limited to, bags, boxes, cartons, bottles, packages of any type or design or material, over-wrap, shrink-wrap, affixed components (e.g., stapled, adhered, or the like), or combinations thereof. A single package may be containers of individual components physically associated such that they are considered a unit for manufacture, distribution, sale, or use.

The term "virtual package" means that the components of a kit are associated by directions on one or more physical or virtual kit components instructing the user how to obtain the other components, e.g., a bag or other container containing one component and directions instructing the user to go to a website, contact a recorded message or a fax-back service, view a visual message, or contact a caregiver or instructor to obtain instructions on how to use the kit or safety or technical information about one or more components of a kit.

As used herein, ranges are used herein in shorthand, to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a sauce" or "a method" includes a plurality of such "sauces" or "methods." Similarly, the words "comprise", "comprises", and "comprising" are to be interpreted inclusively rather than exclusively. Likewise the terms "include", "including" and "or" should all be construed to be inclusive, unless such a construction is clearly prohibited from the context.

The terms "comprising" or "including" are intended to include embodiments encompassed by the terms "consisting essentially of" and "consisting of". Similarly, the term "consisting essentially of" is intended to include embodiments encompassed by the term "consisting of".

All percentages expressed herein are by weight of the composition based on comparison with the total weight of the loaf-type food product. For example, a sauce in an amount of 25% by weight means that the amount of the sauce is 25% of the total weight of the loaf-type food product. Thus, if the total weight of the loaf-type food product is 100 grams, the actual amount of the sauce corresponding to 25% by weight would be 25 grams.

The methods and compositions and other advances disclosed here are not limited to particular methodology, protocols, ingredients, components and reagents described herein because, as the skilled artisan will appreciate, they may vary. Further, the terminology used herein is for describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides compositions useful for preserving the freshness of loaf-type food products. The compositions comprise sauces capable of maintaining the freshness of loaf-type food products for at least 3, 4, 5, 6, or more hours. After the extended period, the loaf-type food products having the sauces still retain their original color and fresh wet appearance, and there is no crust formation on the loaf-type food products. The sauces enrobe the loaf-type food products thereby slowing the drying rate caused by exposing the loaf-type food products to air. Accordingly, the sauces retain or lock the moisture inside the loaf-type food products for an extended period thereby preserving the freshness of the loaf-type food products.

To sufficiently preserve the loaf-type food products for an extended period, the sauces must have a sufficient viscosity such that the sauces stay at least partially on top of the loaf-type food products. The sauces may also slowly drip over the loaf-type food products, thereby blocking air from reaching the loaf-type food products and drying out the surface of loaf-type food products. This maintains the freshness (e.g., original condition) of the loaf-type food products for at least 3, 4, 5, 6, or more hours.

Generally, the sauces have a viscosity of at least about 11 centipoises (cP). In various embodiments, the viscosity can range from about 11 cP to about 44 cP including about 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43 cP, and the like and any ranges in between. The viscosity range of the sauces can further prevent the sauces themselves from drying out over an extended period.

The sauces can be made from any ingredients that produce an edible sauce and protect the freshness of the loaf-type food products by providing the necessary viscosity of the sauces described herein. Preferably, the sauces include one or more gel components in a sufficient amount to provide the viscosity of about 11 cP or more. The gel components can be gelatin, gellan gum, xanthan gum, locust bean gum, pectin, carrageenan (e.g., kappa, iota, or lambda), cellulose gum, gum arabic, modified starch, or a combination thereof.

In various embodiments, the sauces comprise from about 0.1 to about 3% kappa carrageenan, preferably from about 0.15 to about 2%; from about 0.1 to about 2% locust bean gum, preferably from about 0.15% to about 1.5%; and from about 0.2 to about 3% guar gum, preferably from about 0.2 to about 2%. The remainder of the sauces comprises water, with possible additional ingredients as discussed.

In various embodiments, the sauces may contain additional edible ingredients. For example, the sauces may contain one or more: 1) flavors such as chicken, beef, fish, vegetables, and the like; 2) colors; 3) visible nutrition ingredients such as spinach, carrots, cranberries, and the like; or 4) condiments such as parsley, oregano, and the like. When provided in the sauces, these ingredients are typically added when the sauces are made.

In another aspect, the invention provides a loaf-type food product associated with one or more of the sauces described herein, preferably in a container. For example, the sauce can be added to the same container as the loaf-type food product. Typically, the amount of sauce used is sufficient to cover the surface of the loaf-type food product when the container is emptied. Therefore, the sauce amount will depend on the shape of the loaf-type food product, which can be any suitable shape such as a cube, cylinder, and the like. Generally, a sufficient amount of the sauce can range from about 10% to about 50% by weight, preferably from about 15% to about 45% by weight, and more preferably from about 20% to about 40% by weight of the amount of the loaf-type food product. For example, in various embodiments, about 15 to about 25 grams of the sauce can be used to preserve the freshness of about 61 to 71 grams of the loaf-type food product. When additional edible ingredients are used in the sauce, the weight of the edible ingredients as included as part of the weight of the sauce. In a preferred embodiment, the loaf-type food product is associated with one or more of the sauces, preferably one sauce, in a container, preferably a sealed container. In the most preferred embodiment, the sealed container has been retorted.

In an alternative aspect, the invention provides methods for preserving the freshness of loaf-type food products. The methods comprise adding a loaf-type food product and a sauce capable of maintaining the freshness of a loaf-type food product for at least 3, 4, 5, 6, or more hours to a container. The sauce is added to the container so that the opening of the container is on a side opposite of the sauce while the loaf-type food product is closest to the opening. This order of the sauce and loaf-type product inside the container ensures that the sauce covers the top of the loaf-type food product when the container is opened and the loaf-type food product is removed from the container (e.g., by flipping the container over so that the opening is on the bottom closest to a serving apparatus). It should be appreciated that any container can be used to store the sauce and the loaf-type food product. Preferably, the container is a plastic container or metal container such as a can.

In an aspect, the invention provides compositions useful for preserving the freshness of loaf-type food products. The compositions comprise gels capable of maintaining the freshness of loaf-type food products for at least 3, 4, 5, 6, or more hours. After the extended period, the loaf-type food products having the gels still retain their original color and fresh wet appearance, and there is no crust formation on the loaf-type food products. The gels enrobe the loaf-type food products thereby slowing the drying rate caused by exposing the loaf-type food products to air. Accordingly, the gels retain or lock the moisture inside the loaf-type food products for an extended period thereby preserving the freshness of the loaf-type food products.

To sufficiently preserve the loaf-type food products for an extended period, the gels must have a viscosity such that the gels stay at least partially or completely on top of the loaf-type food products. The gels may also cover the sides of the loaf-type food products. This maintains the freshness (e.g., original condition) of the loaf-type food products for at least 3, 4, 5, 6, or more hours.

Generally, the gels have a viscosity of at least about 45 cP or more so as to remain in a substantially sold form. In any embodiments of the gels of the present disclosure, the viscosity can range from about 45 cP to about 66 cP including about 46, 47, 48, 49, 50, 51, 52, 53, 54, 55, 56, 57, 58, 59, 60, 61, 62, 63, 64, 65 cP, and the like and any ranges in between. The viscosity range of the gels can further prevent the gels themselves from drying out over an extended period.

The gels can be made from any ingredients that produce an edible gel and protect the freshness of the loaf-type food products by providing the necessary viscosity of the gels described herein. Preferably, the gels include one or more gel components in a sufficient amount to provide the viscosity of about 45 cP or more. The gel components can be gelatin, gellan gum, xanthan gum, locust bean gum, pectin, carrageenan (e.g., kappa, iota, or lambda), cellulose gum, gum arabic, modified starch, or a combination thereof.

In various embodiments, the gels comprise from about 0.05 to about 2% kappa carrageenan, preferably from about 0.1 to about 1.5%; 0.1 to about 4% xanthan gum, preferably from about 0.2 to about 2%; and from about 0.05 to about 2% potassium chloride, preferably from about 0.1 to about 1%. The remainder of the sauce comprises water, with possible additional ingredients as discussed.

In various embodiments, the gels may contain additional edible ingredients. For example, the gels may contain one or more: 1) flavors such as chicken, beef, fish, vegetable, and the like; 2) colors; 3) visible nutrition ingredients such as spinach, carrots, cranberries, and the like; or 4) condiments such as parsley, oregano, and the like. When provided in the gels, these ingredients are typically added when the gels are made.

In another aspect, the invention provides a loaf-type food product associated with one or more of the gels described herein, preferably in a container. For example, the gel can be added to the same container as the loaf-type food product. Typically, the amount of gel used is sufficient to cover the surface of the loaf-type food product when the container is emptied. Therefore, the gel amount will depend on the shape of the loaf-type food product, which can be any suitable shape such as a cube, cylinder, and the like. Generally, a sufficient amount of the gel can range from about 10% to about 50% by weight, preferably from about 15% to about 45% by weight, and more preferably from about 20% to about 40% by weight of the amount of the loaf-type food product. For example, in various embodiments, about 15 to about 25 grams of the gel can be used to preserve the freshness of about 61 to 71 grams of the loaf-type food product. When additional edible ingredients are used in the gel, the weight of the edible ingredients as included as part of the weight of the gel. In a preferred embodiment, the loaf-type food product is associated with one or more of the gels, preferably one gel, in a container, preferably a sealed container. In the most preferred embodiment, the sealed container has been retorted.

In an alternative aspect, the invention provides methods for preserving the freshness of loaf-type food products. The methods comprise adding a loaf-type food product and a gel capable of maintaining the freshness of the loaf-type food product for at least 3, 4, 5, 6, or more hours to a container. The gel is added to the container so that the opening of the container is on a side opposite of the gel while the loaf-type food product is closest to the opening. This order of the gel and loaf-type product in the container ensures that the gel covers the top of the loaf-type food product when the container is opened and the loaf-type food product is removed from the container (e.g., by flipping the container over so that the opening is on the bottom closest to a serving apparatus). It should be appreciated that any container can be used to store the gel and the loaf-type food product. Preferably, the container is a plastic container or metal container such as a can.

In an alternative aspect, the invention provides kits suitable for maintaining the freshness of a loaf-type food product. The kits comprise in separate containers in a single package or in separate containers in a virtual package, as appropriate for a kit component, (A) the sauces or the gels described herein and a loaf-type food product (e.g., together in the same container), and (B) one or more of: (1) a device for removing from the container the loaf-type food product with the sauces or the gels described herein; (2) instructions for how to serve the loaf-type food product with the sauces or the gels described herein; (3) a serving apparatus for serving the loaf-type food product with the sauces or the gels described herein; or (4) a serving utensil for serving the loaf-type food product with the sauces or the gels described herein.

When the kit comprises a virtual package, the kit can be limited to instructions in a virtual environment in combination with one or more physical kit components. The kits may contain the kit components in any of various combinations and/or mixtures. For example, in one embodiment, the kit includes a container having a loaf-type food product and a sauce or a gel described herein and a device for removing from the container the loaf-type food product. In another embodiment, the kit includes a container having a loaf-type food, product and a sauce or a gel described herein and a serving apparatus.

In another aspect, the invention provides a means for communicating information about or instructions for using the sauces or the gels described herein for one or more of: (1) removing the sauces or the gels described herein along with the loaf-type food product from a container; (2) describing the retained long-term freshness of a loaf-type food product provided by the sauces or the gels described herein to a pet owner; (3) describing the rapid crusting or rapid drying of a typical aging loaf-type food product when removed from a container; (4) describing the color change of a typical aging loaf-type food product when removed from a container; (5) describing the off odor of a typical aging loaf-type food product when removed from a container; (6) describing the staleness of a typical aging loaf-type food product when removed from a container; (7) describing the reduced visual appeal of a typical aging loaf-type food product when removed from a container; or (8) combining the sauces or the gels described herein with other food products.

The communication means can be a document, digital storage media, optical storage media, audio presentation, or visual display containing the information or instructions. More specifically, the means can be a displayed website, a visual display kiosk, a brochure, a product label, a package insert, an advertisement, a handout, a public announcement, an audiotape, a videotape, a DVD, a CD-ROM, a computer readable chip, a computer readable card, a computer readable disk, a USB device, a FireWire device, a computer memory, or any combination thereof.

In another aspect, the present invention provides packages comprising indicia (e.g., markings) describing the beneficial contents of the packages, namely, the sauces or the gels suitable for preserving the freshness of a loaf-type food product for at least 3, 4, 5, 6, or more hours. The indicia can be in the form of words, symbols, pictures, photographs, figures, or combinations thereof to show details or examples of the preserved freshness of the loaf-type food product provided by the sauces or the gels described herein. The packages can further contain a loaf-type food product and a sauce or gel suitable for preserving the freshness of the loaf-type food product for at least 3, 4, 5, 6, or more hours.

In another aspect, the invention provides methods for manufacturing a loaf-type food product package. The methods comprise filling a container with a sauce capable of maintaining the freshness of a loaf-type food product for at least 3, 4, 5, 6, or more hours, filling the container with a loaf-type food product, and sealing the container. In various embodiments, the methods further comprise retorting the sealed container. The container is opened on a side opposite of the sauce.

In another aspect, the invention provides methods for manufacturing a loaf-type food product package. The methods comprise filling a container with a gel capable of maintaining the freshness of a loaf-type food product for at least 3, 4, 5, 6, or more hours, filling the container with a loaf-type food product, and sealing the container. In various embodiments, the methods further comprise retorting the sealed container. The container is opened on a side opposite of the gel.

In the methods for manufacturing a loaf-type food product package, the sauce or gel can be made prior to being added to the container. For example, any suitable ingredients and amounts for the making the sauce or gel such as water, gel components, flavors, colors, visible nutrition ingredients and/or condiments are mixed together in a mixing device to provide the desired viscosity for the sauce or gel. Alternatively, the visible nutrition ingredients can be added to the sauce or gel after the initial mixing of the ingredients and right before the filling of the container. The sauce or gel is then added to the container in a first layer. If necessary, the container can be cooled so as to set the sauce or gel to a particular viscosity or stiffness. The loaf-type food product can then be added to the container as a second layer near the opening.

The loaf-type food product can be made and added separately from the sauce or gel. For example, the loaf-type food product can be in the form of meat emulsions that can set in the can or be pre-formed and inserted into the can. Non-limiting examples of meat emulsions for use with the sauce or gel are described in U.S. Pat. Nos. 7,736,686; 6,649,206; and 4,781,939. The container having the sauce or gel and the loaf-type food product can then be sealed, steamed and retorted.

In another aspect, the invention provides continuous production lines capable of manufacturing a container comprising the sauces or gels described herein and a loaf-type food product. More specifically, the continuous production lines can include various devices for making a container having a sauce or gel and a loaf-type food product. For example, the continuous production lines can include a mechanical mixer for combining the ingredients of the sauce or gel. The continuous production lines can include a first filler for filling the container with a layer of the sauce or gel and a second filler for filling the container with a layer of the loaf-type food product. A separate process can be used to manufacture the loaf-type food product. The filled container can then be sealed or closed and taken to a steamer/retorting station. A conveyor belt can be used to transport the containers from one station to another station of the continuous production lines.

In another aspect, the invention provides multi-pack packages comprising 1) a plurality of containers arranged in an array, each of the plurality of containers comprising a loaf-type food product and the sauces or gels described herein, and 2) one or more devices for retaining the containers in the array. In various embodiments, the devices are boxes made from paper, plastic, polymers, or a combination thereof. In others, the devices are systems of connected plastic rings affixed to each of the containers. In still others, the devices are wrappings of plastic of similar materials, e.g., twelve cans stacked in an array and wrapped in plastic. In some embodiments, the multi-pack packages have one or more handles affixed to the multi-pack packages to facilitate handling and transporting the multi-pack packages.

In other embodiments, the devices further comprise one or more windows that permit the package contents to be viewed without opening the multi-pack package. In some embodiments, the windows are a transparent portion of the devices. In others, the windows are missing portions of the devices that permit the containers to be viewed without opening the multi-pack package.

In preferred embodiments, the multi-pack packages further comprise one or more indicia describing the contents of the containers in the packages. The indicia can be in the form of labels, printing on the packages, stickers, and the like and include words, symbols, pictures, photographs, figures, or combinations thereof to provide detail or examples of the preserved freshness of the loaf-type food product provided by the sauces or gels described herein. In a preferred embodiment, a label is affixed to the multi-pack packages containing a word or words, picture, design, acronym, slogan, phrase, or other device, or combination thereof, that indicates that the contents of the package contain a sauce or gel capable of maintaining the freshness of the loaf-type food product for at least 3, 4, 5, 6, or more hours.

EXAMPLES

The invention can be further illustrated by the following examples, although it will be understood that these examples are included merely for purposes of illustration and are not intended to limit the scope of the invention unless otherwise specifically indicated.

Example 1

A 100-pound batch loaf product was made by grinding frozen meats and fish per Table 1 through a ⅛" die plate, using a Weiler grinder. Kappa carrageenan (0.05 lbs) and locust bean (0.05 lbs) gums were dispersed and hydrated in 12.807 lbs of water by blending with a high speed gum disperser (Tekmar) for 30 seconds. The ground meats and fish, hydrated gums and the remaining loaf ingredients (Table 1) were added to Rietz mixer and heated to 125° F. by steam while being mixed continuously to form a pumpable loaf mix. After heating, the loaf mix was emulsified using a meat emulsifier (Karl Schnell). The emulsified loaf mix was filled into cans (3 ounce capacity—209.5×107). Each can contained 86 grams of the loaf mix. The cans were covered and hermetically sealed. They were then retorted at 250° F. for 50 minutes then cooled to ambient temperature. FIG. 1-1 shows this product immediately after removal from the can.

TABLE 1

Canned Loaf Product

| Ingredients | lbs |
| --- | --- |
| Meats | 40.422 |
| Fish | 44.286 |
| Oat Flour | 2.00 |
| Vitamin & Mineral Premix | 0.385 |
| Kappa Carrageenan | 0.05 |
| Locust Bean Gum | 0.05 |
| Water | 12.807 |
| Total | 100.0 |

Example 2

The viscous sauce component was made by the following steps. The kappa carrageenan, locust bean gum, and guar gums were weighed out per Table 2 into a tub and mixed by stirring with a spatula. 49.2 lbs of potable water that was heated to 145° F. was weighed into a stainless steel tank. A high speed gum disperser (Tekmar) was placed in the water. While the disperser was running, the pre-blended gums were streamed in at the vortex that was created in the water. After dispersion, the gums solution was blended for another 1 minute. This formed a viscous sauce (clear sol).

TABLE 2

Viscous Sauce

| Ingredients | Lbs |
| --- | --- |
| Water | 49.2 |
| Kappa Carrageenan | 0.3 |
| Locust Bean Gum | 0.2 |
| Guar Gum | 0.3 |
| Total | 50.0 |

Example 3

Assembling the Loaf Mix and Viscous Sauce

The loaf mix and viscous sauce were cans of 3 ounce capacity (209.5×107). For each can, 20 grams of the viscous sauce (Example 2) was added first into the bottom of the can. The cans were cooled until the viscous sauce (sol) formed a gel (below 72° F.). 66 grams of loaf mix made as in Example 1 was added on top of the gel. The cans were covered and hermetically sealed and retorted, lid side up, at 250° F. for 50 minutes then cooled to ambient. Upon reporting, the gel breaks down into a very slow flowing sauce. FIG. 1-7 shows this product immediately after removal from the can.

Example 4

The gel component for a loaf in gel (terrine type product) was made by the following steps. The kappa carrageenan, xanthan gums and potassium chloride were weighed out per Table 3 into a tub and mixed by stirring with a spatula. 49.4 lbs of potable water that was heated to 190° F. was weighed into a stainless steel tank. A high speed gum disperser (Tekmar) was placed in the water. While the disperser was running, the pre-blended gum/salt mix were streamed in at the vortex that was created in the water. After dispersion, the gum solution was blended for another 1 minute. This formed a viscous sol. Forming the loaf in the gel product followed the procedure of Example 3 with the loaf mix made as per Example 1. For this product, the gel structure was maintained as shown in FIG. 1-4 immediately after it was removed from the can.

TABLE 3

Gel Composition

| Ingredients | Lbs |
| --- | --- |
| Water | 49.4 |
| Kappa Carrageenan | 0.15 |
| Xanthan Gum | 0.3 |
| Potassium Chloride | 0.15 |
| Total | 50.0 |

Example 5

Changes in Loaf on Exposure to Ambient Conditions

Three products were placed on separate tared plates and initial weights were recorded for each. These products were a standard loaf product as in Example 1; a standard loaf product in the gel; and a standard loaf product in the viscous sauce. These products were left exposed to air at room temperature. Each product was weighed every 15 minutes and the weights were recorded starting from 9:00 am until 3:00 pm and shown in Table 4. It is clear that there was a great drying out of the standard loaf compared to the loaf in the gel or the sauce.

As the weights of the loaf products were being taken, observations of the loaf products' appearances were also done. FIG. 1 (FIGS. 1-1 through FIGS. 1-9) shows photographs of the products that were taken immediately as the products were removed from the cans (Initial) and after 3 hours and 6 hours exposure to ambient atmosphere. It is clear that the standard loaf became darker and developed crustiness around the edges and surface. This change is objectionable and considered as a loss of freshness. As is shown, the gel covered loaf remained stable. Also, the sauce covered loaf remained stable. Surprisingly, the sauce did not flow off the loaf as would be expected from typical, known sauces. As a result, the loaf with sauce maintained its moist, fresh appearance.

TABLE 4

Moisture Loss on Exposure to Ambient Conditions

| Time | Standard Loaf (gms) | % Change in Weight | Std Loaf with Gel (gms) | % Change in Weight | Std Loaf with Sauce (gms) | % Change in Weight |
|---|---|---|---|---|---|---|
| 9:15 AM | 82.1 | 0.6 | 84.2 | 0.6 | 81.4 | 0.6 |
| 9:30 AM | 81.6 | 1.2 | 84.0 | 0.8 | 81.1 | 1.0 |
| 9:45 AM | 81.0 | 1.9 | 83.4 | 1.5 | 80.7 | 1.5 |
| 10:00 AM | 80.5 | 2.5 | 83.0 | 2.0 | 80.4 | 1.8 |
| 10:15 AM | 79.9 | 3.3 | 82.7 | 2.4 | 80.0 | 2.3 |
| 10:30 AM | 79.5 | 3.8 | 82.4 | 2.7 | 79.7 | 2.7 |
| 10:45 AM | 79.0 | 4.4 | 82.1 | 3.1 | 79.3 | 3.2 |
| 11:00 AM | 78.5 | 5.0 | 81.8 | 3.4 | 79.0 | 3.5 |
| 11:15 AM | 78.0 | 5.6 | 81.4 | 3.9 | 78.6 | 4.0 |
| 11:30 AM | 77.7 | 5.9 | 81.3 | 4.0 | 78.5 | 4.2 |
| 11:45 AM | 77.2 | 6.5 | 81.0 | 4.4 | 78.1 | 4.6 |
| 12:00 PM | 76.8 | 7.0 | 80.7 | 4.7 | 77.8 | 5.0 |
| 12:15 PM | 76.3 | 7.6 | 80.1 | 5.4 | 77.4 | 5.5 |
| 12:30 PM | 75.8 | 8.2 | 80.0 | 5.5 | 77.1 | 5.9 |
| 12:45 PM | 75.4 | 8.7 | 79.7 | 5.9 | 76.8 | 6.2 |
| 1:00 PM | 74.9 | 9.3 | 79.3 | 6.4 | 76.5 | 6.6 |
| 1:15 PM | 74.5 | 9.8 | 78.2 | 7.7 | 76.1 | 7.1 |
| 1:30 PM | 74.0 | 10.4 | 78.7 | 7.1 | 75.8 | 7.4 |
| 1:45 PM | 73.8 | 10.7 | 78.5 | 7.3 | 75.6 | 7.7 |
| 2:00 PM | 73.3 | 11.3 | 78.2 | 7.7 | 75.2 | 8.2 |
| 2:15 PM | 72.8 | 11.9 | 77.9 | 8.0 | 74.9 | 8.5 |
| 2:30 PM | 72.5 | 12.2 | 77.6 | 8.4 | 74.6 | 8.9 |
| 2:45 PM | 71.9 | 13.0 | 77.2 | 8.9 | 74.1 | 9.5 |
| 3:00 PM | 71.6 | 13.3 | 76.9 | 9.2 | 73.9 | 9.8 |

Example 6

The viscosities (centipoises, cP) of the sauce or gel components prior to filling into the cans were measured and shown in Table 5. These were taken using a Brookfield DV II viscometer. The instrument was auto zeroed at room temperature per the instruction manual. For each solution (for sauce or for gel), the liquid was poured in a 400 mL cylinder. The measurement temperature of the solution was targeted to be 58.5-60° C. that approximated the temperature at which it was filled into cans per examples 2 and 4. For the sauce formulation (Example 2) at 58.9° C., Brookfield spindle #2 (setting 62) was used and viscosity measurements were taken per the manual instructions at speeds shown in Table 5. Because of the lower viscosity of the gelling solution a larger spindle (#4, at entry setting 64) was used and measurements repeated as for the viscous sauce. Temperature of the gelling solution at which the viscosity was measured was 60° C. and results are shown in Table 5. Form the results it can be seen that the viscosity of the sauce was higher than that of the gelling solution at filling and was very shear sensitive.

TABLE 5

Filling Viscosity

| RPM | Viscous Sauce cP | Gel cP |
|---|---|---|
| 0.5 | 27000 | 1240 |
| 1 | 16600 | 1200 |
| 2.5 | 8280 | 928 |
| 5 | 5100 | 904 |
| 10 | 3240 | 840 |
| 20 | 1880 | 605 |
| 50 | 972 | 364 |
| 100 | 557 | 283 |

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims the invention may be practiced otherwise than as specifically described.

The invention is claimed as follows:

1. A method for preserving the freshness of a loaf-type food product, the method comprising adding a loaf-type food product and a sauce capable of maintaining the freshness of the loaf-type food product for at least 3 hours to a container, wherein an opening for the container is on a side opposite of the sauce, and the sauce covers a top of the loaf-type food product when the container is opened and the loaf-type food product is removed from the container.

2. The method of claim 1 wherein the sauce is in an amount ranging from about 10% to about 50% by weight of an amount of the loaf-type food product.

3. The method of claim 1 wherein the sauce includes one or more gel components.

4. The method of claim 3 wherein the gel components are selected from the group consisting of gelatin, gellan gum, xanthan gum, locust bean gum, pectin, carrageenan, cellulose gum, gum arabic, modified starch, and combinations thereof.

5. The method of claim 1 wherein the sauce has a viscosity ranging from about 11 cP to about 44 cP.

6. The method of claim 1 wherein the sauce stays completely on the covers a top of the loaf-type food product when the container is opened and the loaf-type food product is removed from the container.

7. The method of claim 1, wherein the sauce consists of water, kappa-carrageenan, iota-carrageenan and guar gum.

8. The method of claim 1, wherein the sauce consists of water, kappa-carrageenan, and iota-carrageenan.

9. The method of claim 1, wherein the adding of the loaf-type food product and the sauce to the container comprises:
    adding the sauce to the container to position the opening of the container on the side opposite the sauce, so the sauce is a first layer in the container;
    producing a loaf mix by mixing water, flour, and one or more gums with at least one of meat or fish;
    emulsifying the loaf mix;
    filling the emulsified loaf mix into the container as a second layer in the container between the first layer and the opening, by adding the emulsified loaf mix to the container separately from the sauce, the adding of the emulsified loaf mix to the container comprises adding the emulsified loaf mix onto the sauce in the container;
    sealing the container after adding the emulsified loaf mix onto the sauce in the container; and retorting the container after the sealing of the container, the retorting sets the emulsified loaf mix in the container to form the loaf-type food product with the sauce completely on a top of the loaf-type food product.

\* \* \* \* \*